Figure 1:
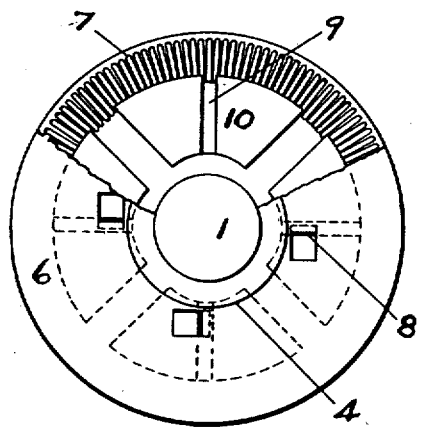

June 12, 1923.

H. L. BRUMP

SHORT CIRCUITING DEVICE

Filed April 4, 1922     2 Sheets-Sheet 1

1,458,682

WITNESSES:
Parker B. Martin
William B. Hornell

INVENTOR,
Herbert L. Brump,
BY Howard D. Smith,
ATTORNEY

June 12, 1923.

H. L. BRUMP

SHORT CIRCUITING DEVICE

Filed April 4, 1922

2 Sheets-Sheet 2

1,458,682

WITNESSES:

INVENTOR,
Herbert L. Brump,
BY
Howard S. Smith,
ATTORNEY

Patented June 12, 1923.

1,458,682

UNITED STATES PATENT OFFICE.

HERBERT L. BRUMP, OF DAYTON, OHIO, ASSIGNOR TO THE DAYTON FAN & MOTOR COMPANY, OF DAYTON, OHIO, A CORPORATION OF OHIO.

SHORT-CIRCUITING DEVICE.

Application filed April 4, 1922. Serial No. 549,572.

*To all whom it may concern:*

Be it known that I, HERBERT L. BRUMP, a citizen of the United States, residing in the city of Dayton, in the county of Montgomery and State of Ohio, have invented certain new and useful Improvements in Short-Circuiting Devices, of which the following is a specification.

My invention relates primarily, though not exclusively, to certain alternating current motors, known to the trade as repulsion induction motors, which are designed to start as repulsion motors having series motor characteristics. When they approach the speed at which an alternating current induction motor would normally function, the armature windings are short-circuited, after which the short-circuited armature acts as the squirrel cage rotor of an induction motor.

The primary object of my invention, therefore, is to provide a simple and effective device for short circuiting the armature windings of repulsion induction motors after they have attained the speed at which alternating current induction motors normally function. The invention may also be employed whereever it is desired to use a centrifugally impelled, flexible element for performing a mechanical or an electrical function.

The invention comprises a coil spring which surrounds a number of suitable weights that are constrained, by suitable means, to turn with the armature shaft, and are so mounted as to move outwardly by centrifugal force as the speed of the armature increases. As the weights move outwardly, the coil spring is expanded by them to form contact between the ends of the commutator bars and a copper shell or retainer to short circuit the armature windings so that the armature will function as the squirrel cage rotor of an induction motor. When the speed of the device decreases, the coil spring which forms the contact member will contract to return and hold the weights in their inner positions, as when the device is being started or is at rest.

Many possible variations in the construction and arrangement of the device will be apparent. The spring which effects the contact may take the form other than that of a round cross section, or it might be formed of a series of suitable punchings. Furthermore the spring, however formed, may be used only as a contact member, the return and the retention of the weights being accomplished by other means such as a smaller spring within the large contact spring. Basically, the invention comprises a centrifugal device in which a number of suitably restrained weights are adapted to establish, through a flexible element, a contact short circuiting the bars of the commutator as the weights are thrown outwardly by centrifugal force.

Figure 2:
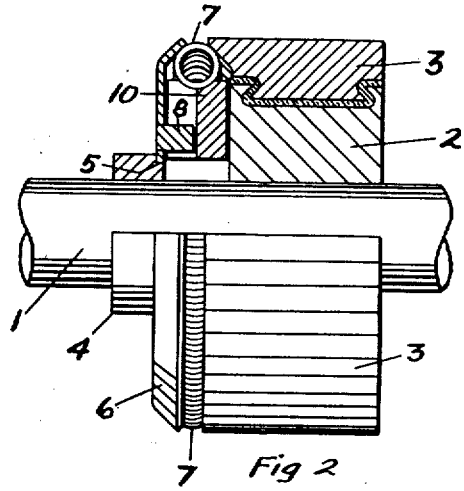
Figure 3:
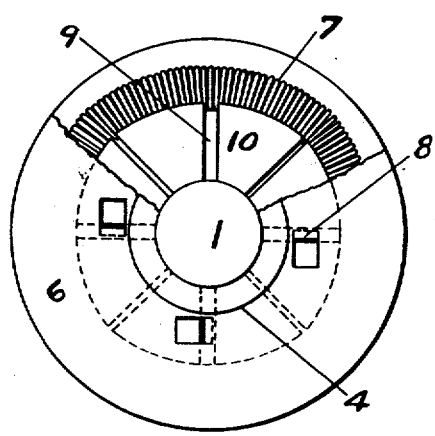
Figure 4:
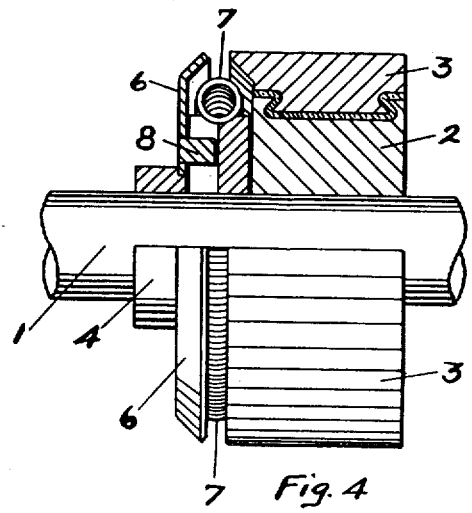
Figure 5:
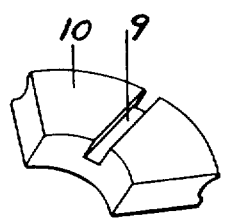
Figure 6:
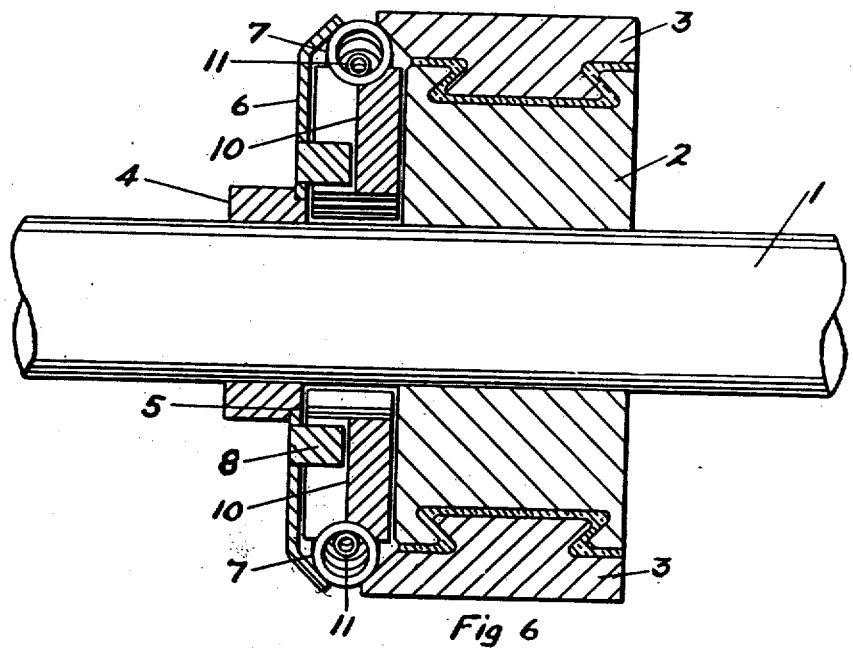
Figure 7:
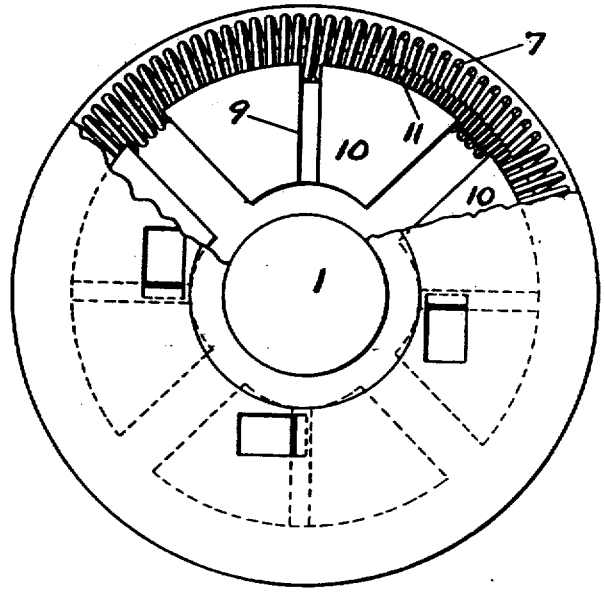

In the drawings illustrating my invention and the various modifications thereof, Figure 1 is an end elevation of my short circuiting device, with the shell partly broken away to show the contact spring and weights in their short circuiting position. Figure 2 is a side elevation, partly in section, of the device when short circuiting the armature windings. Figure 3 is an end elevation of the device, with the shell partly broken away to show the contact spring and weights when the armature is at rest. Figure 4 is a side elevation, partly in section, of said device when the armature is at rest. Figure 5 is a perspective view of one of the centrifugal weights. Figure 6 is a cross sectional view of a modified form of my improved short circuiting device, showing a tension spring within the contact spring. And Figure 7 is an end elevation of the modified form of said device, with the shell partly broken away to reveal the inner and outer springs.

Throughout the specification and drawings, similar reference characters denote corresponding parts.

In the drawings, the numeral 1 designates an armature shaft upon which is secured a commutator spider 2. Secured to the latter in the conventional manner is a circumferential series of commutator bars 3 of uniform length. (See Figures 2 and 4.)

Fast on the shaft 1 a short distance in front of the commutator just described, is a hub 4 whose inner peripheral portion is formed to provide a ledge 5 to receive the open central part of a cup-shaped disc 6. The latter is tightly fitted on the annular ledge portion 5 of the hub 4 to turn with the latter when the armature shaft 1 is rotated.

The outer annular edge of the inwardly turned flanged rim of the disc 6 is but a short distance from the inwardly tapering end portions of the commutator bars 3, to permit a coil spring 7, preferably constructed of phosphor bronze, to make contact with both the disc and the commutator bars for the purpose of short circuiting the latter when the spring is expanded by the centrifugal means now to be described.

Turned inwardly from the cup-shaped disc 6, a short distance from the hub 4, is a series of equally-spaced flat driving lugs 8. Each of these lugs is adapted to project loosely into a radial groove 9 provided in the middle portion of a segmental weight 10, preferably constructed of steel, whereby these weights may be mounted between the cupped disc 6 and the commutator spider 2 for a free outward movement along the lugs 8 when the armature shaft 1 is rotated. (See Figures 1, 2 and 5.)

The outer periphery of each one of the segmental weights 10 is concaved to receive a respective part of the inner periphery of the coil spring 7, which acts as a retaining member to hold the weights against the armature shaft 1 when the latter is at rest. When the rotation of the armature shaft is started, these weights 10, being free to slide outwardly along the lugs 8, will act as centrifugal elements to press the spring 7 outwardly, as the speed of the device increases, until the said spring contacts with the outer edge portion of the cupped disc 6 and the opposite ends of the commutator bars 3 to short circuit the latter. At this point the short circuited armature will function as the squirrel cage rotor of an induction motor, but up to the time the commutator bars are short circuited by the spring 7, the device will start as a repulsion motor having series characteristics.

From the above description it will be seen that the spring 7 not only acts as a contact member, but as a retaining element for the segmental weights when the device is starting or is at rest. In Figures 6 and 7 I have shown a modified short circuiting device in which I place a small garter spring 11 within the large spring 7, to act as a retaining element for the weights, leaving the spring 7 free to function only as the contact member. This, among other things, enables the outer spring to be constructed of a material of great conductivity at the sacrifice of extreme flexibility, since the contraction of the spring is assisted by the inner spring 11, to retain the weights 10 in their inner positions.

From the foregoing description it will be seen that I have provided a simple and effective short circuiting device in which a number of suitably restrained weights are adapted to establish, through a flexible member, a contact which short circuits the bars of the commutator of a repulsion induction motor as the weights are thrown outwardly by centrifugal force when the speed of the motor approaches that at which an alternating current induction motor would normally function.

I do not wish to be limited to the details of construction and arrangement herein shown and described, and any changes or modifications may be made therein within the scope of the subjoined claims.

Having described my invention, I claim:

1. In an alternating current motor, an armature shaft, a commutator mounted thereon, a cup-shaped disc mounted on said shaft to face the commutator, guiding projections on said disc, centrifugal weights mounted between the disc and commutator and free to move outwardly along said projections, and a flexible element adapted to be moved outwardly by the centrifugal weights, when the armature shaft attains a certain speed, to make contact between the rim portion of the cup-shaped disc and the commutator for the purpose of short circuiting the latter.

2. In an alternating current motor, an armature shaft, a commutator mounted thereon, a cup-shaped disc mounted on said shaft to face the commutator, inwardly-turned driving lugs on said disc, segmental weights mounted between the disc and the commutator, each weight having a central radial groove adapted to receive a driving lug and free to be moved outwardly along it by centrifugal force, said weights also having concaved outer peripheries, and a garter spring fitted in the concaved peripheries of the weights and adapted to be moved outwardly by the latter when the armature shaft attains a certain speed, to make contact between the rim portion of the cup-shaped disc and the commutator for the purpose of short circuiting the latter.

In testimony whereof I have hereunto set my hand this 21st day of March, 1922.

HERBERT L. BRUMP.

Witness:
HOWARD S. SMITH.